(12) United States Patent
Gruzdeva et al.

(10) Patent No.: US 6,905,095 B1
(45) Date of Patent: Jun. 14, 2005

(54) MULTIPLE PLATFORM AIRCRAFT CARGO LOADER

(75) Inventors: Zina Gruzdeva, Leesburg, FL (US); Juan Francisco Gou, Orlando, FL (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 10/753,781

(22) Filed: Jan. 8, 2004

(51) Int. Cl.[7] ................................................. B64D 9/00
(52) U.S. Cl. .................................. 244/137.1; 414/495
(58) Field of Search ........................ 244/137.2, 137.1; 414/495, 347, 343, 496, 917, 497, 592, 654, 414/660, 609; 182/141; 187/9, 18, 8.59, 187/8.71

(56) References Cited

U.S. PATENT DOCUMENTS

| | | | |
|---|---|---|---|
| 3,263,832 A * | 8/1966 | Williams, Jr. et al. ...... 414/344 |
| 3,589,490 A * | 6/1971 | Walkhoff et al. ......... 193/35 R |
| 3,666,127 A | 5/1972 | Guyaux ...................... 214/512 |
| 3,993,207 A * | 11/1976 | Jones ......................... 414/495 |
| 4,304,518 A | 12/1981 | Carder et al. ............... 414/495 |
| 4,306,830 A | 12/1981 | le Duc ........................ 414/343 |
| 4,312,619 A | 1/1982 | Anderson et al. ........... 414/347 |
| D272,482 S | 1/1984 | Verschoor .................... D34/34 |
| 4,541,768 A * | 9/1985 | Walker et al. .............. 414/535 |
| 4,662,809 A | 5/1987 | Sturtz et al. ................ 414/347 |
| 4,701,097 A | 10/1987 | Sturtz ......................... 414/495 |
| 4,886,413 A | 12/1989 | Leon .......................... 414/495 |
| 5,525,019 A * | 6/1996 | Moore et al. ............... 414/347 |
| 5,630,694 A * | 5/1997 | Ihara .......................... 414/495 |
| 5,718,325 A * | 2/1998 | Doster et al. ............... 198/592 |
| 2004/0115034 A1 * | 6/2004 | Arijoki et al. .............. 414/495 |

* cited by examiner

Primary Examiner—Galen Barefoot
(74) Attorney, Agent, or Firm—Pauley Petersen & Erickson

(57) ABSTRACT

An aircraft cargo loader includes a first generally horizontal platform structure adjustable in height between ground level and a first elevated position. The loader includes a second generally horizontal platform structure positioned adjacent to the first generally horizontal platform structure and adjustable in height relative to the first platform structure. A third generally horizontal platform structure is positioned adjacent to the second generally horizontal platform structure and is adjustable in height relative to the first and second generally horizontal platform structures. The aircraft cargo loader may include additional platform structures and one or more may be carried by a vehicle.

18 Claims, 4 Drawing Sheets

MULTIPLE PLATFORM AIRCRAFT CARGO LOADER

FIELD OF THE INVENTION

The present invention generally relates to aircraft cargo loading apparatus and, more particularly, to loaders comprising conveyor platforms capable of being raised and lowered relative to a cargo door of the aircraft for loading and off-loading cargo.

BACKGROUND OF THE INVENTION

In the air cargo industry, loaders are used to load cargo onto an aircraft and unload cargo from the aircraft. As used herein, therefore, the term "loader" is directed to apparatus for performing either or both of these functions. Generally, two types of apparatus of this type are in use. The first is a single platform loader which is elevated between a position adjacent the ground and a position at the height of the cargo door sill or lower edge. The second is a two platform loader in which a first platform is maintained at the level of the cargo door sill and a second platform is raised and lowered with respect to the first platform. Cargo to be unloaded from the aircraft is therefore transferred between the cargo compartment of the aircraft and the first platform and then transferred from the first platform to the second platform when the second platform is in its elevated position. The second platform is then lowered and the cargo is off-loaded. The loading procedure is reversed.

The current loaders have various drawbacks, especially with respect to accommodating larger aircraft being designed and manufactured today. For example, the cargo door of such larger aircraft is at a much higher level than in the past. Also, due to the larger size of the aircraft and correspondingly larger carrying capacities, much higher volumes of cargo must be loaded and off-loaded. Ideally, such loading and off-loading should be accomplished in a comparable amount of time to smaller aircraft. With current loaders, manufacturing a single, adjustable platform such that it can raise and lower to and from much greater heights presents practical problems related to stability and size requirements. In addition, the increased amount of required travel takes additional time, or increased speed, both of which may be undesirable.

For at least these reasons, it would be desirable to provide an aircraft loader capable of effectively handling the cargo loading and unloading needs of even the largest aircraft while maintaining low loading and unloading time requirements for loading and unloading the cargo.

SUMMARY OF THE INVENTION

The present invention is generally directed to an aircraft cargo loader having at least three height adjustable, generally horizontal platform structures. Each platform structure may be raised and lowered during loading and/or unloading operations. More specifically, a first generally horizontal platform structure is adjustable in height between ground level and a first elevated position. A second generally horizontal platform structure is positioned adjacent to the first generally horizontal platform structure and is adjustable in height independently from the first generally horizontal platform structure. A third generally horizontal platform structure is positioned adjacent to the second generally horizontal platform structure and is adjustable in height relative to the first and second generally horizontal platform structures. In various embodiments, the second generally horizontal platform structure is adjustable in height relative to the first platform structure between the first elevated position and a second elevated position higher than the first elevated position and the third generally horizontal platform structure is adjustable in height between the second elevated position and a third elevated position higher than the second elevated position. Alternatively, the second and third height adjustable platform structures may both remain at the second elevated position during loading and unloading. For example, this would be desirable if a lower level cargo door need to be accessed at the second elevated position.

The first, second, and third generally horizontal platform structures may be carried by a mobile vehicle which itself could be self-propelled or otherwise moved, such as by towing. Preferably, each of the first, second, and third generally horizontal platform structures further includes a conveyor, which may be a powered conveyor, rollers on an upper surface of the platform structure, or other conveying mechanisms.

The invention contemplates various embodiments and arrangements of the multiple, height adjustable platform structures. As one example, the first, second, and third generally horizontal platform structures are positioned serially with respect to each other such that cargo is moved in a generally straight line between the first, second, and third generally horizontal platform structures. As another example, the first, second and third generally horizontal platform structures are positioned such that cargo is moved in a generally straight line between the first and second generally horizontal platform structures and in a transverse direction relative to the generally straight line when moving between the second and third generally horizontal platform structures. In another embodiment, two lower ground level platform structures are used in conjunction with a single upper level platform structure to increase transfer speeds. In other embodiments, a fourth generally horizontal platform structure is positioned adjacent to the third generally horizontal platform structure and is adjustable in height relative to the first, second, and third generally horizontal platform structures between the third elevated position and a fourth elevated position higher than the third elevated position. Alternatively, the third and fourth platform structures may remain at the third elevated position during operation. The fourth generally horizontal platform structure may be positioned such that the cargo moves in the transverse direction when moving between the third and fourth generally horizontal platform structures. Alternatively, the fourth generally horizontal platform structure may be positioned such that the cargo moves in a direction parallel to the generally straight line when moving between the third and fourth generally horizontal platform structures.

Various methods of loading and unloading aircraft cargo are also contemplated by this invention. Generally, a method of transferring cargo into or out of an aircraft cargo compartment according to the invention can comprise transferring the cargo between a first generally horizontal platform structure and a second generally horizontal platform structure at a first elevated position above ground level. The cargo is transferred between the second generally horizontal platform structure and a third generally horizontal platform structure at a second elevated position higher than the first elevated position. The methods of this invention may be used to effectively increase the height through which cargo may be transferred and/or also increase the speed at which cargo may be loaded into or off-loaded from the aircraft. Increased cargo transfer speeds are attained since multiple loading and unloading operations may be performed while one or more intermediate platform structures of the loader move between upper and lower cargo transfer positions.

Various additional features, methodology, and attendant advantages will become more readily apparent upon further review of a detailed description of representative embodiments of the invention as set forth below.

DETAILED DESCRIPTION OF PREFERRED EMBODIMENTS

Figure 1:
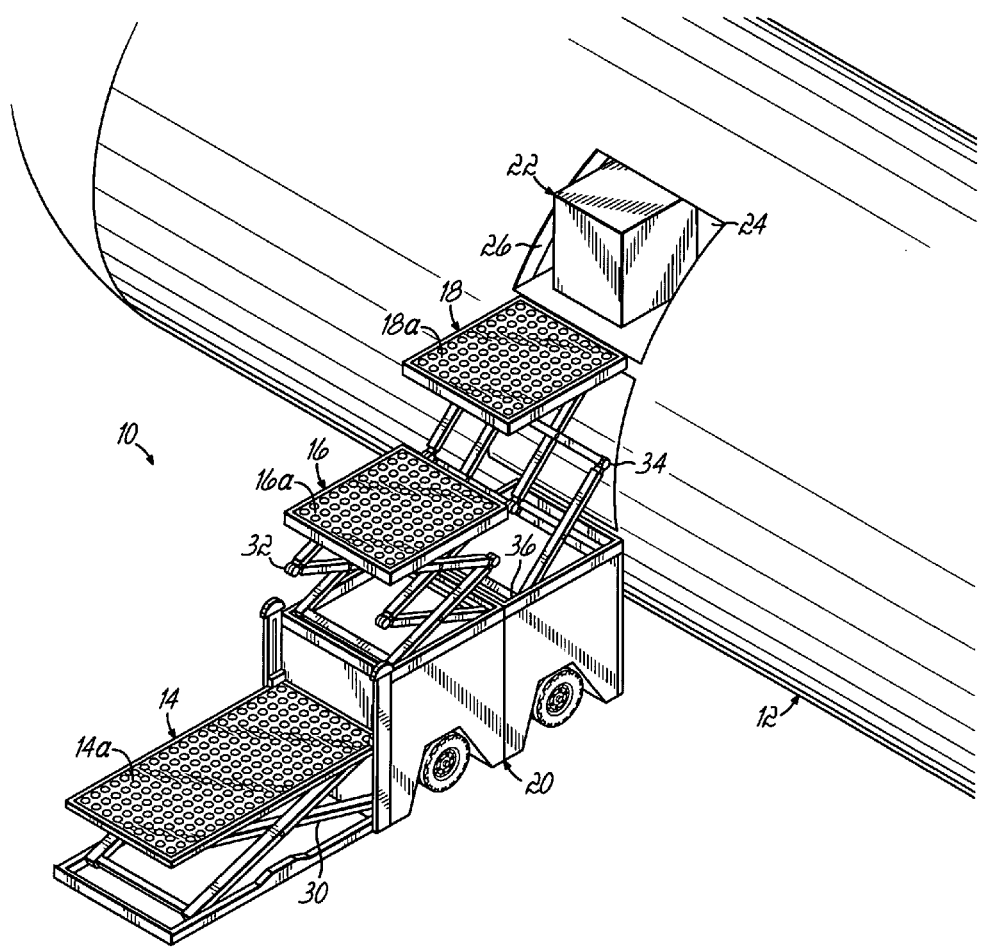
FIG. 1 is a perspective view of a first embodiment of the invention in the form of a platform structure loader having three height adjustable platform structures.
Figure 2:
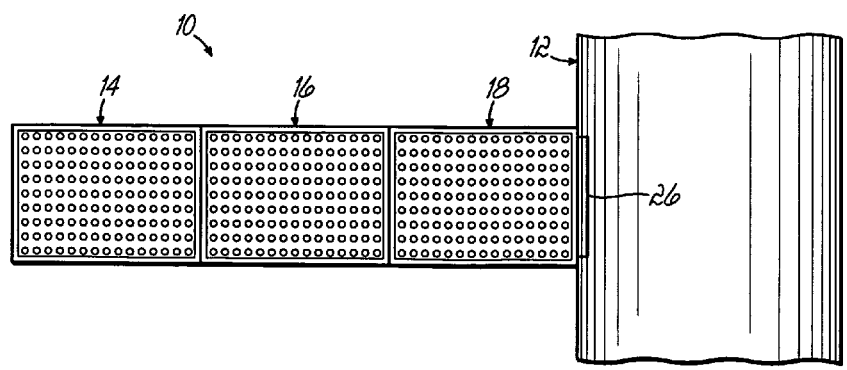
FIG. 2 is a schematic top view of the loader shown in FIG. 1.

FIGS. 1 and 2 illustrate a cargo loader 10 positioned adjacent to an aircraft 12. Cargo loader 10 includes three generally horizontal platform structures 14, 16, 18 each being vertically adjustable between at least two positions. Respective upper surfaces 14a, 16a, 18a preferably include conveying mechanisms which may be powered or non-powered, such as roller mechanisms as schematically shown in FIG. 1. Each platform structure 14, 16, 18 is carried by a vehicle 20 which may be a powered, self-propelled vehicle or may be a non-self-propelled vehicle which could be towed by another vehicle. By way of loader 10 cargo 22 may be loaded and/or unloaded from an aircraft cargo compartment 24 through a door 26.

Platform structures 14, 16, 18 are capable of being raised and lowered through the use of scissor lift mechanisms 30, 32, 34, conventional hydraulic cylinder mechanisms, mechanical lift mechanisms or other suitable lift mechanisms such as electric motors and appropriate drive systems (not shown).

In use, for example, to unload cargo 22 from aircraft 12, cargo 22 is first transferred from cargo compartment 24 to platform structure 18. Platform structure 18 is lifted and remains at the aircraft door sill height. Platform structure 16 lifts to the height of platform structure 18 and cargo 22 is conveyed onto platform structure 16. Platform structure 16 is then lowered to the upper edge 36 of vehicle 20 or any other suitable transfer height. Platform structure 14 moves between upper edge 36 or any other suitable transfer height and an appropriate ground level position which may be very close to ground level or at some intermediate off-loading position between the tarmac, for example, and upper edge 36. At this ground level location, cargo 22 may be off-loaded from platform structure 14 onto another vehicle, for example, and conveyed to another location. It will be appreciated that the loading of cargo 22 onto aircraft 12 may be conducted using a similar reverse stair-stepping procedure. To further increase the speed at which cargo 22 is either off-loaded from aircraft 12 or loaded onto aircraft 12, one or more of the platform structures 14, 16, 18 may be raised or lowered simultaneously with one or more of the other platform structures 14, 16, 18 during the loading or unloading procedure. For example, while platform structure 16 is raising between upper edge 36 and platform structure 18, platform structure 14 may be lowering to ground level to receive the next cargo load. Such simultaneous upward and downward movement of the various platform structures 14, 16, 18 ensures that the most efficient and timely movement of cargo takes place between the various platform structures as well as onto and off of loader 10.

Figure 3:
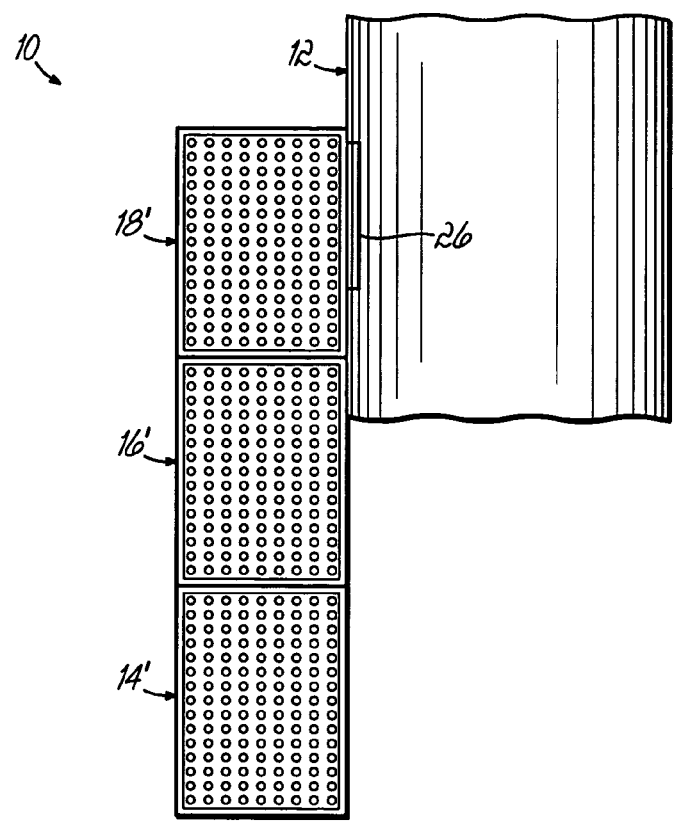
FIG. 3 is a schematic top view of a first alternative loader, similar to that shown in FIG. 1, but illustrating the platform structures positioned along the length of the aircraft.

FIG. 3 illustrates an alternative embodiment which essentially moves platform structures 14', 16', 18' into a parallel arrangement to aircraft 12 such that the cargo (not shown) moves in a generally straight line direction parallel to the length of the aircraft 12 as opposed to the generally straight line direction perpendicular to the aircraft 12 as shown in FIGS. 1 and 2. All other aspects of the structure and operation of the embodiment shown in FIG. 3 may be the same as described above.

Figure 4:
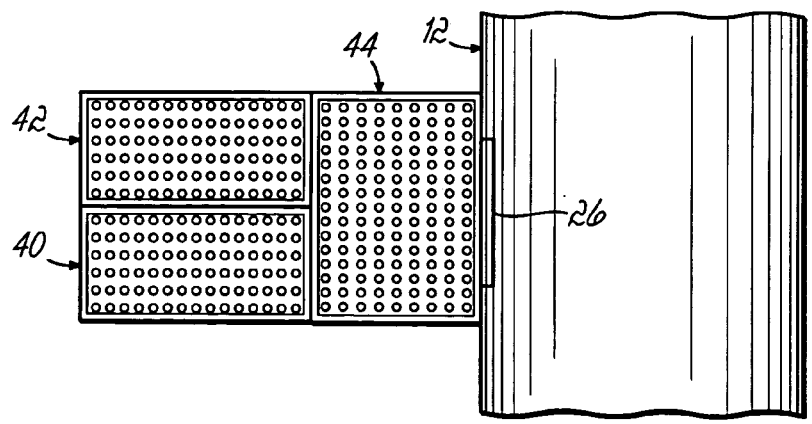
FIG. 4 is a schematic top view of a second alternative loader having three height adjustable platform structures.

FIG. 4 illustrates another arrangement of platform structures 40, 42, 44 arranged or positioned with respect to the cargo door 26 of aircraft 12. In this embodiment, platform structures 40 and 42 both move between ground level positions and an intermediate upper level position higher than ground level to respectively transfer cargo to or from upper level platform structure or bridge 44, which is also height adjustable. Specifically, platform structure 44 is also adjustable in height so as to maintain its level with the aircraft door sill height during cargo loading and unloading operations. Alternatively, platform structure 44 could also move between cargo door 26 and the respective elevated positions of platform structures 40, 42 which may be below cargo door 26. Therefore, when one of the platform structures 40 or 42 is being used to transfer cargo to or from platform structure 44, the other of the platform structures 40 or 42 may be used to transfer cargo to or from a vehicle or other apparatus at ground level. This significantly increases loading and unloading speeds.

Figure 5:
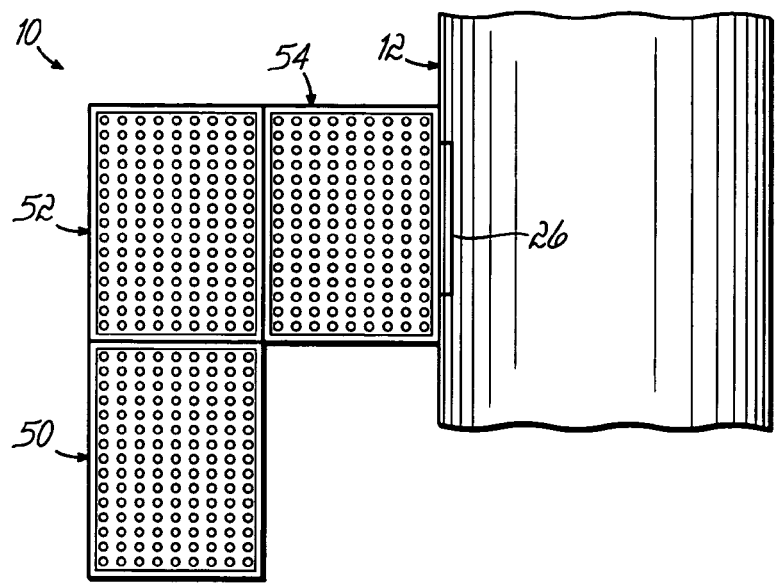
FIG. 5 is a schematic top view of a third alternative loader having three height adjustable platform structures.

FIG. 5 illustrates another alternative embodiment of a loader comprising first, second and third platform structures 50, 52, 54 positioned with respect to the cargo door 26 of aircraft 12. In this embodiment, platform structure 50 may be the lower level platform structure. Platform structure 52 may be the intermediate level platform structure, and platform structure 54 is the upper level or bridge platform structure. Each platform structure is independently height adjustable as described in connection with FIG. 1 and is used in the same manner described with respect to FIG. 1. The difference is that cargo moves in a generally straight line fashion between platform structures 50 and 52 and moves in a direction transverse to the straight line direction when transferring between platform structures 52 and 54. All other aspects and use of this embodiment may be the same as described in connection with FIGS. 1 and 2.

Figure 6:
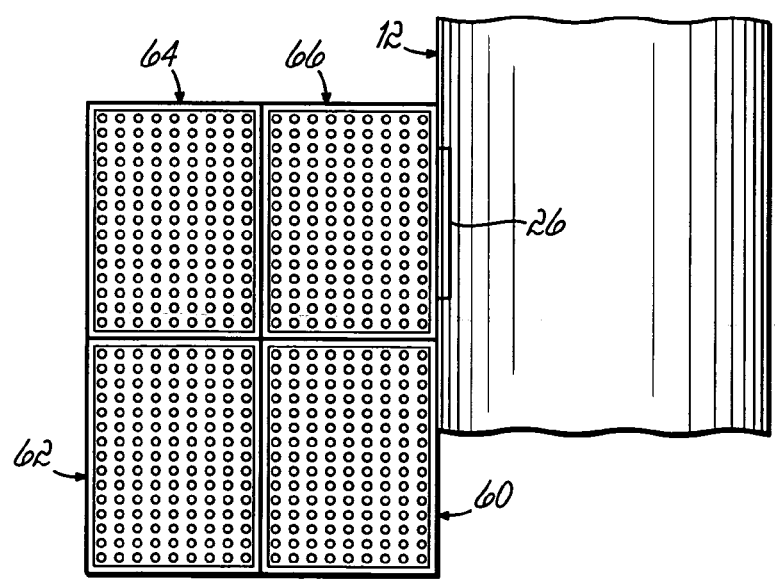
FIG. 6 is a schematic top view of a fourth alternative loader having four height adjustable platform structures.

FIG. 6 illustrates another embodiment of a loader comprising four height adjustable platform structures 60, 62, 64, 66 positioned with respect to the cargo door of an aircraft 12. This embodiment which utilizes four platform structures may be useful, for example, when particularly high elevations are necessary for very large aircraft. Platform structure 60 may be the lower level platform structure. Platform structure 62 may be a first intermediate level platform structure which is height adjustable between an upper level position of lower platform structure 60 and a lower level position of a second intermediate platform structure 64.

Platform structure 64 is then movable between its lower level position and an upper level position raised therefrom. Upper level platform structure or bridge 66 is height adjustable between a lower level position (which is at the upper level position of platform structure 64) and the door sill of cargo door 26. The use of this loader is the same as described in connection with FIGS. 1 and 2, except that one additional intermediate level platform structure is used and, therefore, additional "stair steps" are provided for reaching additional heights and increasing cargo transfer speed.

Figure 7:
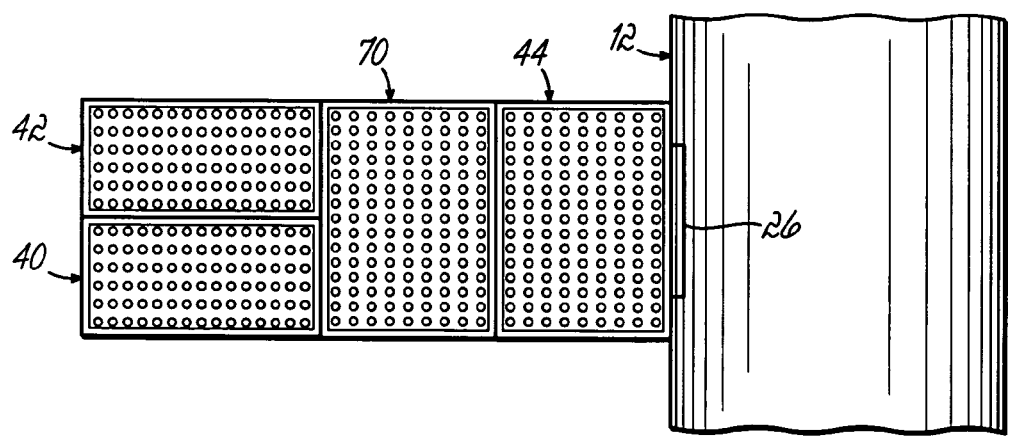
FIG. 7 is a schematic top view of a fifth alternative loader having four height adjustable platform structures.

FIG. 7 illustrates another embodiment of a loader including four height adjustable platform structures 70, 72, 74, 76 positioned with respect to the cargo door 26 of aircraft 12. This embodiment is similar to the embodiment shown in FIG. 4, except that an intermediate level platform structure 70 is positioned between the respective parallel lower level platform structures 40, 42 and the upper level or bridge platform structure 44. The principles of operation associated with this embodiment are therefore the same as described above with respect to FIG. 4, except that additional heights may be reached due to the addition of height adjustable intermediate platform structure 70. In this regard, platform structure 70 will be adjustable between the respective upper level positions of platform structures 40, 42 and the lower level position of platform structure 44. If necessary, platform structure 44 will then be movable to an upper level position adjacent to the door sill of cargo door 26. Alternatively, platform 44 may remain at the height of the door sill during the entire loading or unloading procedure.

In each of the above described embodiments, the platform structure closest to the door 26 may be of a size that it may not solely support an entire cargo container. It may, for example, only act as a short interface between the cargo compartment and the next platform structure. Such a short forward platform structure would thereby serve to space the next platform structure a safe distance from the aircraft fuselage. Thus, as described herein, the transferring, loading and unloading of cargo is not meant to be limited to the full support of a cargo item on a platform structure. It will also be appreciated that each platform structure may be comprised of one or more discrete platforms. While the present invention has been illustrated by a description of various preferred embodiments and while these embodiments has been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

However, the invention itself should only be defined by the appended claims, wherein what is claimed is:

1. An aircraft cargo loading vehicle comprising:
   a movable base structure having a top portion elevated above ground level, a bottom portion with wheels adapted to allow movement of the base structure with respect to the aircraft, a front portion, and a rear portion located opposite to said front portion,
   a first generally horizontal platform structure connected to the rear portion of said base structure and adjustable in height between ground level and a first elevated position,
   a second generally horizontal platform structure carried on the top portion of the base structure and positioned adjacent to said first generally horizontal platform structure to allow transfer of cargo to and from said first generally horizontal platform structure, said second generally horizontal platform structure adjustable in height independently from said first generally horizontal platform structure from said first elevated position to a second, higher elevated position suitable for transferring cargo to and from a cargo compartment of the aircraft, and
   a third generally horizontal platform structure carried on the top portion of the base structure and positioned adjacent to said second generally horizontal platform structure, said third generally horizontal platform structure independently adjustable in height from said first elevated position to said second, higher elevated position,
   wherein said second and third generally horizontal platform structures are sized and configured to independently hold respective loads of cargo such that a first load of cargo having a size which occupies at least about half the area of said second generally horizontal platform structure may be placed on and solely supported by said second generally horizontal platform structure and a second load of cargo of at least the same size as said first load of cargo may be placed on and solely supported by said third generally horizontal platform structure when said second and third platform structures are positioned at said second, higher elevated position.

2. The aircraft cargo loading vehicle of claim 1, wherein said third generally horizontal platform structure is adjustable between the second elevated position and a third elevated position higher than said second elevated position.

3. The aircraft cargo loading vehicle of claim 1, wherein each of said first, second, and third generally horizontal platform structures further comprises a conveyor on an upper surface thereof.

4. The aircraft cargo loading vehicle of claim 1, wherein said first, second, and third generally horizontal platform structures are positioned serially with respect to each other such that cargo is moved in a generally straight line between said first, second, and third generally horizontal platform structures.

5. The aircraft cargo loading vehicle of claim 1, wherein said first, second and third generally horizontal platform structures are positioned such that cargo is moved in a generally straight line between said first and second generally horizontal platform structures and in a transverse direction relative to the generally straight line when moving between said second and third generally horizontal platform structures.

6. The aircraft cargo loading vehicle of claim 5, further comprising a fourth generally horizontal platform structure positioned adjacent to said third generally horizontal platform structure and adjustable in height relative to said first, second, and third generally horizontal platform structures said fourth generally horizontal platform structure positioned such that the cargo moves in the transverse direction when moving between said third and fourth generally horizontal platform structures.

7. The aircraft cargo loading vehicle of claim 5, further comprising a fourth generally horizontal platform structure positioned adjacent to said third generally horizontal platform structure and adjustable in height relative to said first, second, and third generally horizontal platform structures, said fourth generally horizontal platform structure positioned such that the cargo moves in a direction parallel to the generally straight line when moving between said third and fourth generally horizontal platform structures.

8. The aircraft cargo loading vehicle of claim 1, further comprising a fourth generally horizontal platform structure positioned adjacent to said third generally horizontal platform structure and adjustable in height relative to said first, second, and third generally horizontal platform structures.

9. A method of transferring cargo out of an aircraft cargo compartment, comprising:
 transferring a first load of cargo out of the aircraft cargo compartment onto a first generally horizontal platform structure at a first elevated position above ground level such that the first load of cargo is solely supported by the first generally horizontal platform structure,
 transferring the first load of cargo from the first generally horizontal platform structure to a second generally horizontal platform structure at the first elevated position above ground level,
 lowering the second generally horizontal platform structure with the first load of cargo to a second elevated position above ground level which is lower than the first elevated position,
 transferring the first load of cargo from the second generally horizontal platform structure to a third generally horizontal platform structure at the second elevated position above ground level,
 lowering the first load of cargo on the third generally horizontal platform structure from the second elevated position to ground level, and
 transferring the first load of cargo off of the third generally horizontal platform structure.

10. The method of claim 9, wherein transferring the first load of cargo between the first generally horizontal platform structure and the second generally horizontal platform structure further comprises:
 transferring the first load of cargo in a generally straight line away from the aircraft cargo compartment and in a direction perpendicular to the length of the aircraft.

11. The method of claim 9, wherein transferring the load of cargo between the second generally horizontal platform structure and the third generally horizontal platform structure further comprises:
 transferring the first load of cargo in the generally straight line away from the aircraft cargo compartment.

12. The method of claim 9, further comprising:
 carrying a second load of cargo on the first generally horizontal platform while the first load of cargo is transferred from the second generally horizontal platform to the third generally horizontal platform.

13. The method of claim 9, wherein transferring the first load of cargo between the first generally horizontal platform structure and the second generally horizontal platform structure further comprises:
 transferring the first load of cargo in a direction generally parallel to the length of the aircraft.

14. A method of transferring cargo into an aircraft cargo compartment, comprising:
 transferring a first load of cargo onto a first generally horizontal platform structure at ground level,
 raising the first load of cargo on the first generally horizontal platform structure from ground level to a first elevated position above ground level,
 transferring the first load of cargo from the first generally horizontal platform structure to a second generally horizontal platform structure at the first elevated position above ground level,
 raising the second generally horizontal platform structure with the first load of cargo to a second elevated position higher than the first elevated position and at a level suitable for transferring the first load of cargo into the cargo compartment of the aircraft,
 transferring the first load of cargo from the second generally horizontal platform structure to a third generally horizontal platform structure at the second elevated position above ground level,
 solely supporting the first load of cargo with the third generally horizontal platform structure at the second elevated position, and
 transferring the first load of cargo into the aircraft cargo compartment from the third generally horizontal platform structure at the second elevated position.

15. The method of claim 14, wherein transferring the first load of cargo between the first generally horizontal platform structure and the second generally horizontal platform structure further comprises:
 transferring the first load of cargo in a generally straight line toward the aircraft cargo compartment and in a direction perpendicular to the length of the aircraft.

16. The method of claim 15, wherein transferring the first load of cargo between the second generally horizontal platform structure and the third generally horizontal platform structure further comprises:
 transferring the first load of cargo in the generally straight line toward the aircraft cargo compartment.

17. The method of claim 14, further comprising:
 carrying a second load of cargo on the first generally horizontal platform while the first load of cargo is transferred from the second generally horizontal platform to the third generally horizontal platform.

18. The method of claim 14, wherein transferring the first load of cargo between the first generally horizontal platform structure and the second generally horizontal platform structure further comprises:
 transferring the first load of cargo in a direction generally parallel to the length of the aircraft.

* * * * *